(12) United States Patent
Mizuno et al.

(10) Patent No.: US 9,464,914 B1
(45) Date of Patent: Oct. 11, 2016

(54) LANDMARK NAVIGATION

(71) Applicant: International Business Machines Corporation, Armonk, NY (US)

(72) Inventors: Takahisa Mizuno, Tokyo (JP); Tomohiro Shioya, Tokyo (JP); Sayaka Tamai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/842,203

(22) Filed: Sep. 1, 2015

(51) Int. Cl.
*G01C 21/26* (2006.01)
*G01C 21/34* (2006.01)
*G01C 21/36* (2006.01)

(52) U.S. Cl.
CPC .......... *G01C 21/3644* (2013.01); *G01C 21/26* (2013.01); *G01C 21/3667* (2013.01); *G01C 21/3679* (2013.01)

(58) Field of Classification Search
CPC .......... G01C 21/3644; G01C 21/3667; G01C 21/3679; G01C 21/26
See application file for complete search history.

(56) References Cited

U.S. PATENT DOCUMENTS

| | | | | |
|---|---|---|---|---|
| 6,078,865 | A * | 6/2000 | Koyanagi | G01C 21/3644 340/988 |
| 2002/0120622 | A1* | 8/2002 | Hasegawa | G01C 21/20 |
| 2008/0319660 | A1* | 12/2008 | Horvitz | G01C 21/3644 701/431 |
| 2010/0149399 | A1 | 6/2010 | Mukai et al. | |
| 2013/0166197 | A1* | 6/2013 | Tseng | G01C 21/3644 701/426 |
| 2013/0268193 | A1 | 10/2013 | Kritt et al. | |
| 2015/0051835 | A1 | 2/2015 | Jung et al. | |
| 2015/0204689 | A1* | 7/2015 | Aist | G01C 21/3679 701/400 |
| 2016/0069706 | A1* | 3/2016 | Murphy | G01C 21/3682 701/412 |

FOREIGN PATENT DOCUMENTS

| | | |
|---|---|---|
| JP | 2002157253 A | 5/2002 |
| JP | 2007149108 A | 6/2007 |
| JP | 2009511991 A | 3/2009 |
| JP | 2009162722 A | 7/2009 |
| JP | 2011214887 A | 10/2011 |
| JP | 2013149073 A | 8/2013 |
| JP | 2013257866 A | 12/2013 |
| JP | 2014021177 A | 2/2014 |

OTHER PUBLICATIONS

Hile et al., "Landmark-Based Pedestrian Navigation with Enhanced Spatial Reasoning", Proceedings of the 7th International Conference on Pervasive Computing, (2009) Springer-Verlag, Berlin, DE, pp. 1-18.
Google Official Blog, "Go thataway: Google Maps India learns to navigate like a local", Posted Dec. 17, 2009, pp. 1-5, http://googleblog.blogspot.jp/2009/12/go-thataway-google-maps-india-learns-to.html.
Hile et al., "Visual Navigation for Mobile Devices", Mobile and Ubiquitous Multimedia, 2010 IEEE, pp. 16-24.

(Continued)

*Primary Examiner* — Michael J Zanelli
(74) *Attorney, Agent, or Firm* — Kamyar Maserrat; Kazuo Kondoh

(57) ABSTRACT

Information of landmark candidates, near a map route, is extracted. A recognizability score for the landmark candidates is assigned based on the extracted information of the landmark candidates. A landmark is selected, based on recognizability score, among the landmark candidates. And the map route is modified based the selected landmark.

16 Claims, 6 Drawing Sheets

(56) References Cited

OTHER PUBLICATIONS

Grabler et al., "Automatic Generation of Tourist Maps", ACM Transactions on Graphics (TOG)—Proceedings of ACM SIGGRAPH 2008 TOG, vol. 27, Issue 3, Aug. 2008, Article No. 100, pp. 1-11.

Wu, "Multimedia Technologies for Landmark-Based Vehicle Navigation", Submitted in partial fulfillment of the requirements for the degree of Doctor of Philosophy in Language and Information Technologies, Language Technologies Institute School of Computer Science, 2009, pp. 1-150.

Hile et al., "Landmark-Based Pedestrian Navigation from Collections of Geotagged Photos", MUM '2008, Dec. 3-5, 2008, ACM, pp. 145-152.

* cited by examiner

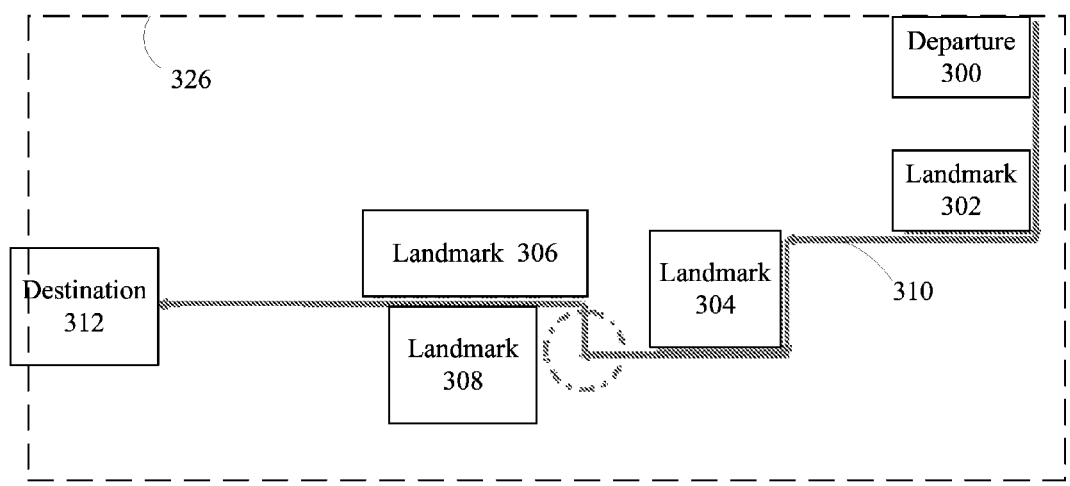

FIG. 3A

| | Size of Logo | Color of Logo | Difference of Background color | Distance from User's Visual Line | User's Taste | Recognizability Score |
|---|---|---|---|---|---|---|
| Landmark 302 | N/A | N/A | N/A | N/A | High | 13 |
| Landmark 304 | Large | Saturation: N/A Brightness: High | Small | Close | Medium | 45 |
| Landmark 306 | Small | Saturation: High Brightness: Medium | Great | Far | Low | 34 |
| Landmark 308 | Medium | Saturation: Low Brightness: Low | Small | Close | Medium | 26 |
| Landmark 314 | Large | Saturation: N/A Brightness: High | Great | Close | High | 65 |

FIG. 3B

LANDMARK NAVIGATION

BACKGROUND

The present disclosure relates generally to the field of computer systems, and more particularly to landmark navigational supports.

Navigation is a field of study that focuses on the process of monitoring and controlling the movement of a craft or vehicle from one place to another. Navigation is also used for the specialized knowledge used to perform navigation tasks; for example, techniques involve locating the navigator's position compared to known locations or patterns. Generally, navigational support solutions monitor a user's position on a map, and may allow the user to select a point of origin and a destination to obtain a recommend a route. These solutions may monitor the user near the recommended route and suggest a new one if the user deviates from recommended route. Due to widespread improvements in communication industries the use of car navigation systems and smartphones has increased rapidly.

SUMMARY

The present disclosure implements a system, method, and computer program product for landmark navigation.

In an embodiment, a method for landmark navigation is provided. The method includes extracting information of a plurality of landmark candidates near a map route. The method includes assigning a recognizability score to the plurality of landmark candidates. The method includes selecting a landmark among the plurality of landmark candidates based on the recognizability score. The method further includes modifying the map route based the selected landmark.

In another embodiment, a computer program product for landmark navigation is provided. The computer program product includes extracting information of a plurality of landmark candidates near a map route. The computer program includes assigning a recognizability score to the plurality of landmark candidates. The computer program includes selecting a landmark among the plurality of landmark candidates based on the recognizability score. The computer program further includes modifying the map route based the selected landmark.

In another embodiment, a computer system for landmark navigation is provided. The computer system includes extracting information of a plurality of landmark candidates near a map route. The computer system includes assigning a recognizability score to the plurality of landmark candidates. The computer system includes selecting a landmark among the plurality of landmark candidates based on the recognizability score. The computer system further includes modifying the map route based the selected landmark.

BRIEF DESCRIPTION OF THE SEVERAL VIEWS OF THE DRAWINGS

FIG. 3A-C are a schematic block diagrams depicting operation of the landmark navigation program, according to embodiments of the present invention.

DETAILED DESCRIPTION

Figure 1A:
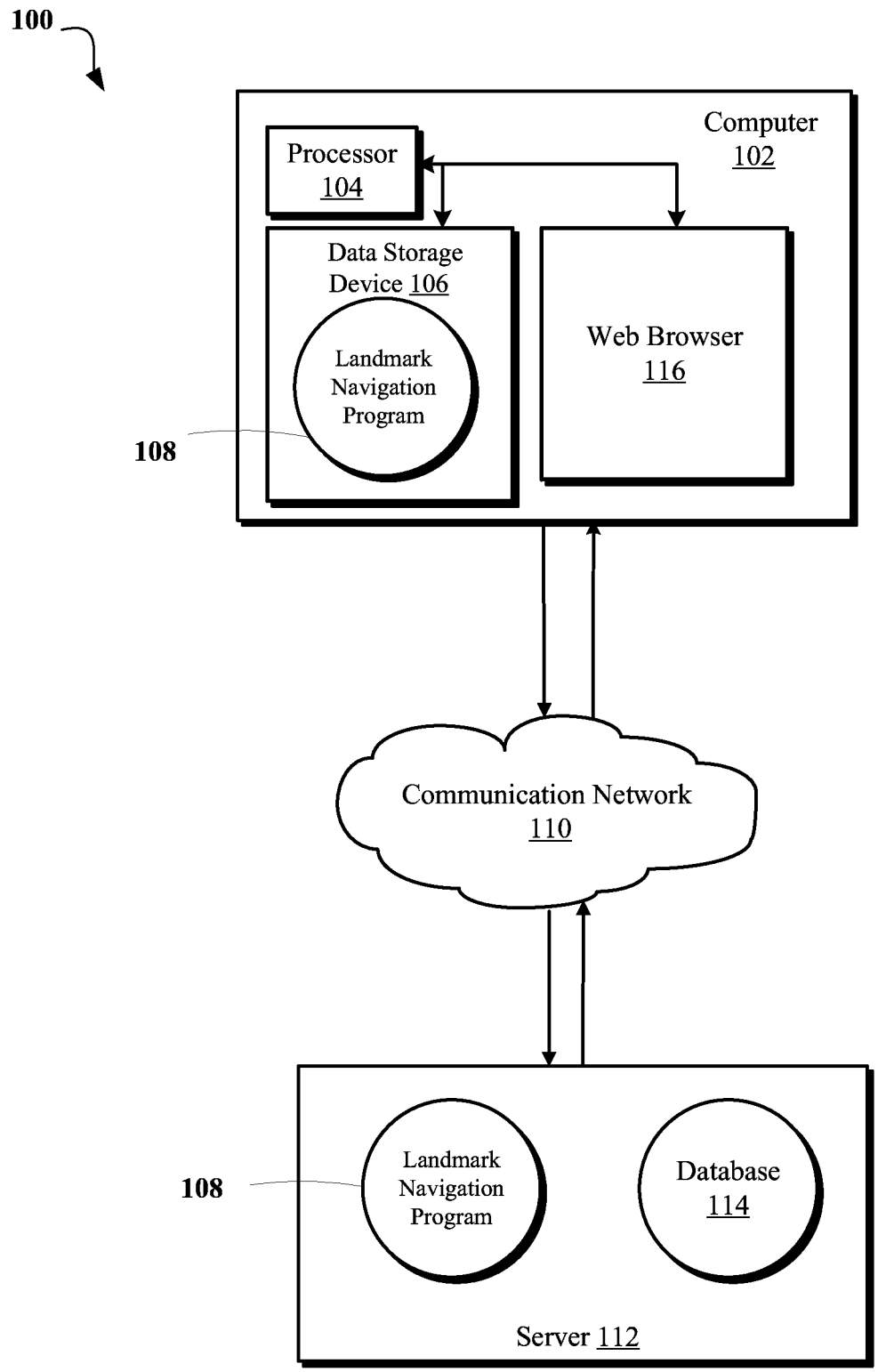
FIG. 1A is schematic block diagram depicting an exemplary computing environment for a landmark navigation program, according to embodiments of the present invention.

FIG. 1A depicts an exemplary environment 100 for managing the display of application forms within a web-based application. In various embodiments of the present disclosure, the environment 100 may include a computer 102 and server 112 connected over communication network 110.

A computer 102 may include a processor 104 and a data storage device 106 that is enabled to run a landmark navigation program 108 and a web browser 116 that displays an application form. Non-limiting examples of a web browser may include: Firefox®, Explorer®, or any other web browser. All brand names and/or trademarks used herein are the property of their respective owners.

An environment 100 may also include a server 112 with a database 114. The server 112 may be enabled to run a program such as a landmark navigation program 108. A communication network 110 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Communication network 110 may also include a number of different types of networks, such as, for example, an intranet, a local area network (LAN), or a wide area network (WAN).

It should be appreciated that FIG. 1A provides only an illustration of one implementation and does not imply any limitations with regard to the environments in which different embodiments may be implemented. Many modifications to the depicted environments may be made based on design and implementation requirements.

The computer 102 may communicate with the server 112 via the communication network 110. The communication network 110 may include connections, such as wire, wireless communication links, or fiber optic cables.

The computer 102 and the server 112 may be, for example, a mobile device, a telephone, a personal digital assistant, a netbook, a laptop computer, a tablet computer, a desktop computer, or any type of computing device capable of running a program and accessing a network. A program, such as a landmark navigation program 108 may run on the computer 102 or on the server 112. It should be appreciated that a landmark navigation program 108 has the same component and operation methods regardless of whether it is run on the server 112 or computer 102. Therefore landmark navigation program 108 applies to both landmark navigation program 108 run on a computer 102 and landmark navigation program 108 run on the server 112 are interchangeably used throughout this disclosure.

Figure 1B:
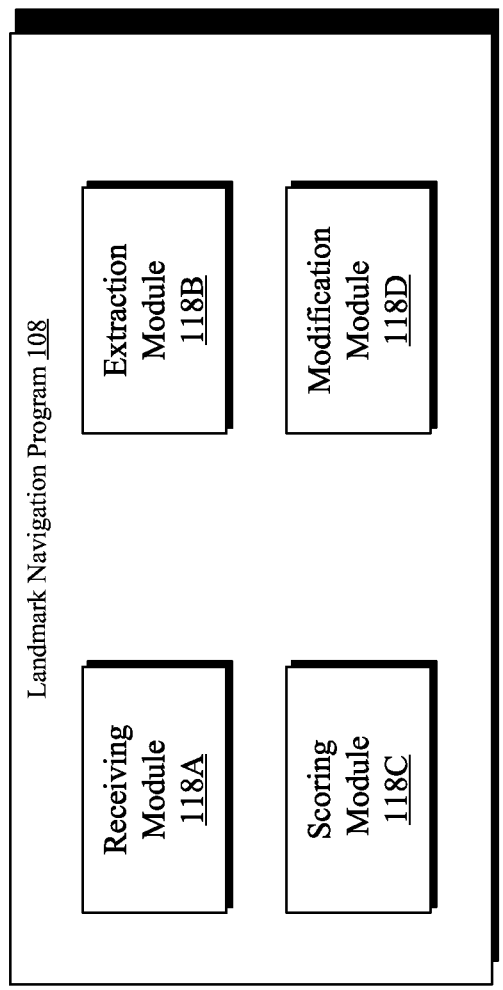
FIG. 1B is as schematic block diagram depicting components of a landmark navigation program, according to embodiments of the present invention.

Referring now to FIG. 1B, a landmark navigation program 108 may include a receiving module 118A, extraction module 118B, scoring module 118C, and modification module 118D. Receiving module 118A may receive a map route indicating departure and destination points. Receiving module 118A may receive the map route from an external device, user, or even an internal navigational unit. Extraction module 118B may extract information regarding different landmark candidates near the map route. Extraction module 118B may extract these information from an external data bank or an internal data table compiled for the extraction purposes. Scoring module 118C may assign a recognizability score to the landmark candidates based on a variety of factors (non-limiting examples of the factors includes user's preferences, distance to the map route, logo characteristic . . . ). Modification module 118D may select a landmark among the landmark candidates based on their respective recognizability scores and modify the map route based on the selected landmark. In an embodiment, detailed in FIG. 3, receiving module receives map route 310. Map route 310 is a route between departure 300 and destination 312 which includes landmarks 302, 304, 306, 314, and 308.

Extraction module 118B extracts information regarding mentioned landmarks. Scoring module 118C scores the mentioned landmarks according to the extracted information (this score corresponds to each landmark candidate's attractiveness). Modification module 118D selects landmark 314 and reroute the new map route to route 316.

Figure 2:
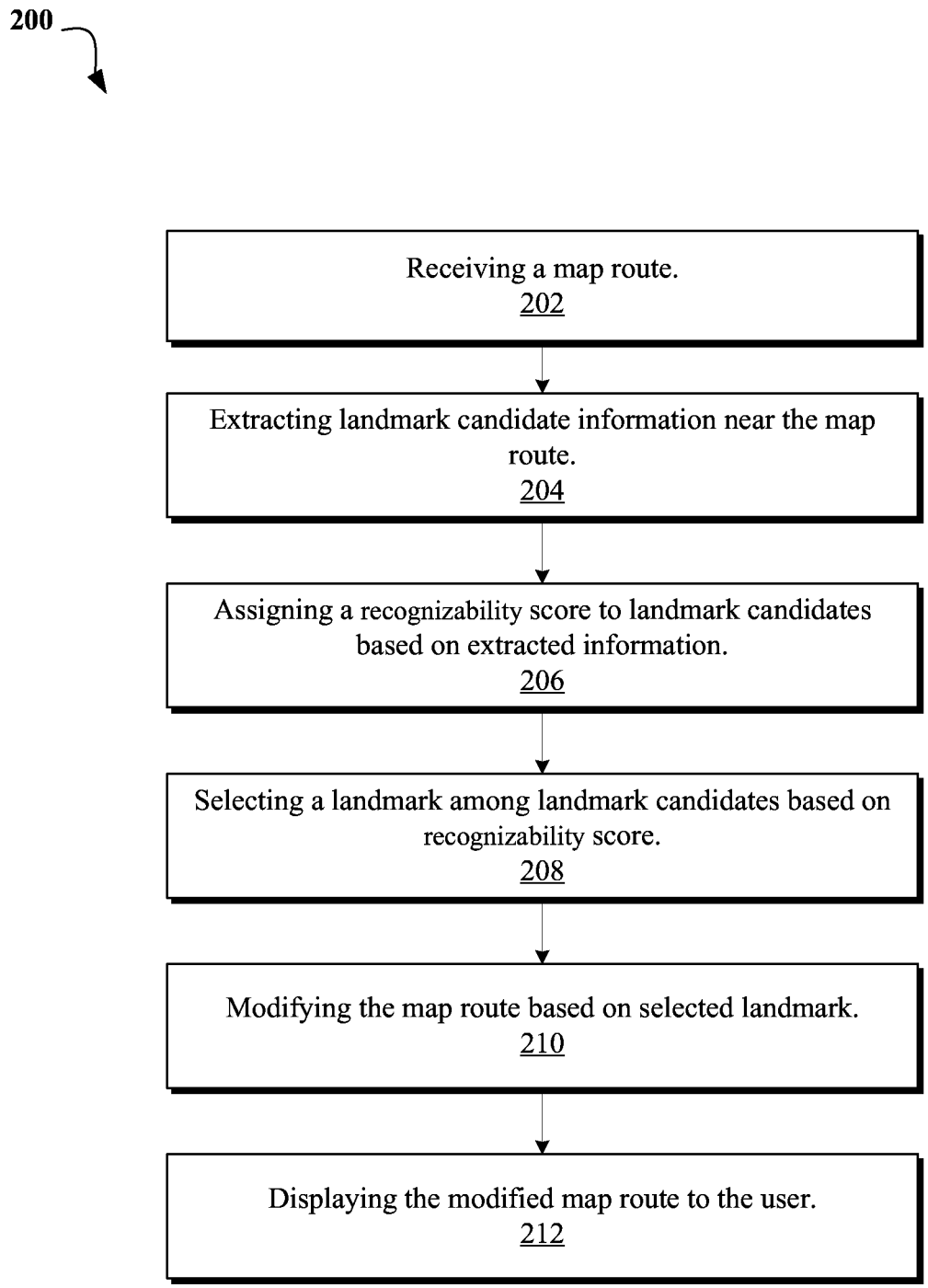
FIG. 2 is a flowchart depicting operational steps of a method for landmark navigation program, according to embodiments of the present invention.

In reference to FIG. 2, steps of method 200 may be implemented using one or more modules of a computer program, for example, landmark navigation program 108, and executed by a processor of a computer, such as computer 102. Steps of the flow chart in FIG. 2, in conjunction with the embodiment of FIG. 3A, depict operational steps and an embodiment of the present disclosure. It should be appreciated that FIG. 2 does not imply any limitations with regard to the environments or embodiments which may be implemented. Many modifications to the depicted environment or embodiment shown in FIG. 2 may be made.

At 202, receiving module 118A may receive a map route. A map route is generally a model for some navigational support which describes at least one different ways possible to arrive at a destination. In one embodiment, a map route may show the main roads in a particular area or the main routes used by buses, trains, and other forms of transport in a particular area. In another embodiment, a map route may include a simple driving sequence which would lead to a destination. Receiving module 118A may receive one or more map route from a user or an electronic input source. Receiving module 118A may receive the map route(s) from a user or a computer implemented system. Non-limiting examples of an input source may be spoken words, typed words, or inputting a map route electronically from a computer implemented source such as an electronic device (e.g. cell phones, tablets, or other electronic devices with speech recognition programs). Furthermore, in another embodiment, receiving module 118A may receive a map route from another module within the landmark navigation program 108. In that embodiment, a user may input the destination and departure points (i.e. addresses), another module within the landmark navigation program 108 may generate a map route, and the receiving module 118A may receive the map route internally.

In the present embodiment, receiving module 118A receives the map route 310 from a Global Positioning System (GPS) application such as a web mapping service program. A Global Positioning System (GPS) is a space-based navigation system that provides location and time information in all weather conditions, anywhere on or near the earth where there is an unobstructed line of sight to four or more GPS satellites. The system provides critical capabilities to military, civil, and commercial users around the world. A web mapping service program is generally developed to ameliorate users with GPS-related services. It may offer satellite imagery, street maps, and 360° panoramic views of streets, real-time traffic conditions, and/or route planning for traveling by foot, car, bicycle, or public transportation. Mapping service programs generally offer a locator for urban businesses and other organizations in numerous countries around the world. Non-limiting examples of a mapping service program include GoogleMaps™, HereMapCreater™, OpenStreetMap™, WikiMapia™ and MetaMap™. In the present embodiment, map route 310 includes driving directions from departure 300 to destination 312.

At 204, extraction module 118B may examine the map route in order to identify landmark candidates and extract different information of the landmark candidates within the map route. A landmark candidate is any landmark located near the map route. It must be appreciated that "near" refers to a predetermined threshold of an area (e.g. radius or a pre-determined distance away from the map route). A landmark is an object or any feature of a landscape or town that is easily seen and recognized from a distance, especially one that enables someone to establish their location. Non-limiting example of a landmark includes stores, parks, recreation centers, restaurants, and office buildings. Extraction module 118B may examine different information sources such as different website or positioning applications in order to extract said information. Extraction module 118B may further use a generated data bank of information. In that embodiment, extraction module 118B may generate a data bank with different information of the landmarks within a geographic location, (e.g. a data bank regarding landmark information within New York City) and use said data bank to extract information regarding landmark candidates located within the map route. Non-limiting examples of information extracted by the extraction module 118B includes, among other things, road conditions, distance of the landmark to the map route, and logo characteristic (e.g. size, font, color, visibility of logo, contrast of colors). Extraction module 118B may also extract user's preferences for different landmarks. In one embodiment, user may consent to landmark navigation program 108 monitoring user's internet activity. Extraction module 118B may monitor user's internet activity and detect references to certain landmarks in order to determine any preferences towards a particular landmarks. For example in that embodiment, if a user has visited a certain store website or has purchased many items (e.g. over a threshold) from a store, extraction module 118B may extract said activities.

In the present embodiment, extraction module 118B uses a mapping service program and the street view of the Google Maps™ in order to extract information regarding the landmark candidates within the map route 310. In the present embodiment, extraction module 118B identifies stores 302-308 within the map route 310. Furthermore extraction module 118B extracts information about landmarks within a predetermined area near the map route. In the present embodiment, extraction module 118B searches within area 326.

At 206 scoring module 118C may assign a recognizability score to each landmark candidate. A recognizability score refers to a quantified measure of user's ability to recognize a particular landmark candidate. Scoring module 118C may use different factors in order to score each landmark candidates. Non-limiting examples of factors used by scoring module 118C include, in one embodiment and among others, locations of the landmark, distance between the map route and the landmark candidate (e.g. distance form user's visual line), logo characteristics (e.g. colors, size, contrast, font, saturation), and user's preferences.

Scoring module 118C may quantify the above-mentioned factors by assigning a numerical point system to each of these factors and their possible categories of answers. In an embodiment, scoring module 118C may divide information regarding landmark candidates into different categories based on predetermined thresholds These categories, in that embodiment, may refer to a predetermined threshold and designate a numerical score to each of the categories.

In another embodiment, scoring module 118C may use a user's direct input. In that embodiment, scoring module 118C may receive, from the user, a list of preferential landmarks. For example, in that embodiment, a user may input directly that the user would like to drive by a certain store, in that embodiment the indicated store may be scored very high.

In yet another embodiment, scoring module 118C may use some raw data analysis in order to gather information regarding user's landmark preferences. In that embodiment, use may allow access to user's social networking account. In that embodiment, scoring module 118C may use information of user's social networking sites gathered by extraction module 118B to obtain preferences on landmarks. For example, a user may allow landmark navigation program 108 access to user's social networking accounts. In that embodiment, extraction module 118B may delve into information that the user has provided on user's social networking page to quantify user's desirability and ease of recognition for various landmarks. For example, in that embodiment, scoring module 118C using information gathered by the extraction module 118B may determine that a user has mention the name of a certain department store in his blog more than a predetermined threshold and therefore assign a high recognizability score.

In the present embodiment, and as depicted in FIG. 3B scoring module 118C, using the extracted information landmark candidates near map route 310, assigns a score to each landmark candidate. In the present embodiment, scoring module 118C utilizes chart 318. Chart 318 is organized by rows and columns. Column 320 represents different landmarks and row 322 represents different factors that scoring module 118C has used in this embodiment to assign the recognizability score (which is represented in column 324). In this embodiment scoring module 118C uses five deciding factors of size of logo, color of logo, difference of background, distance from user's visual line, and user's taste to determine the recognizability score. Scoring module 118C assigns 13 points to large/grand/high, 5 points to medium, and 1 point to small/far/low. Scoring module 118C divides the "size of the logo" category into three categories of large, small, and medium by using 1 ft and 2 ft as threshold for determine the category (i.e. if a logo is 1.5 ft. it is categorized as medium).

Scoring module 118C determines the "color of logo" category score by dividing it into two subcategories of "saturation" and brightness". Color saturation refers to the intensity of a color, expressed as the degree to which it differs from white. Saturation defines a range from pure color (100%) to gray (0%) at a constant lightness level. A pure color is fully saturated. Color brightness is an attribute of user's perception which is mainly influenced by a color's lightness. For one color of specific hue the perception of brightness is also more intense, if we increase saturation. A higher level of saturation may make a color look brighter. Scoring module 118C determines the "difference of background color" by comparing the colors of the logo and the background. Scoring module 118C uses a pre-defined and pre-determined threshold of different colors to determine the category. For example a white logo on a black background is a great difference of background and a purple logo on a brown background is a small difference in the background color. Scoring module 118C uses a pre-determined threshold to determine "distance from user's visual line" category.

When a landmark is closer than 10 ft. to the street it may be in the "close" category, if it is between 10 ft. and 15 ft., it may be classified as "medium", and if it is farther than 15 ft. it may be categorized as "far. Finally, Scoring module 118C may use a pre-determined threshold of numbers to determine use's taste or preferences. In the present embodiment, if the user has used the name of a landmark less than 10 times in his social networking sites, it is considered low, between 10-15 times is considered medium and any number more than 15 is considered high. Scoring module 118C, in the present embodiment, determines a total recognizability score for each landmark candidate (column 324 illustrates that scoring module 118C assigns 13 points to Landmark 302, 45 points to Landmark 304, 34 points to Landmark 306, 26 points to Landmark 308, and 65 points to Landmark 314).

At 208, Modification module 118D may select a landmark from the landmark candidates based on their respective recognizability scores. In an embodiment, Modification module 118D may select one landmark candidate with the highest recognizability score, and in other embodiments, modification module 118D may selects the top three. In another embodiment, modification module 118D may rank the landmark candidates based on their respective recognizability scores and present the user with a list and allow the user to select the landmark that the user desires. Furthermore, in yet another embodiment, modification module 118D may select a landmark candidate based on user's taste. In the present embodiment, modification module 118D selects landmark 314 based on its highest score among other landmark candidates.

At 210, modification module 118D may modify the map route based on the selected landmark. The modification of the map route may be rerouting the map route to a new way that may include the selected landmark. In an embodiment, the new map route may instruct the user to reroute in a way that would drive by the selected landmark. In the present embodiment, modification module 118D modifies the map route 310 to include landmark 314. The new modified map route is new map route 316. It must be appreciated that new map route 316 only modifies map route 310 partially and preserves the same departure and destination points.

Figure 3C:
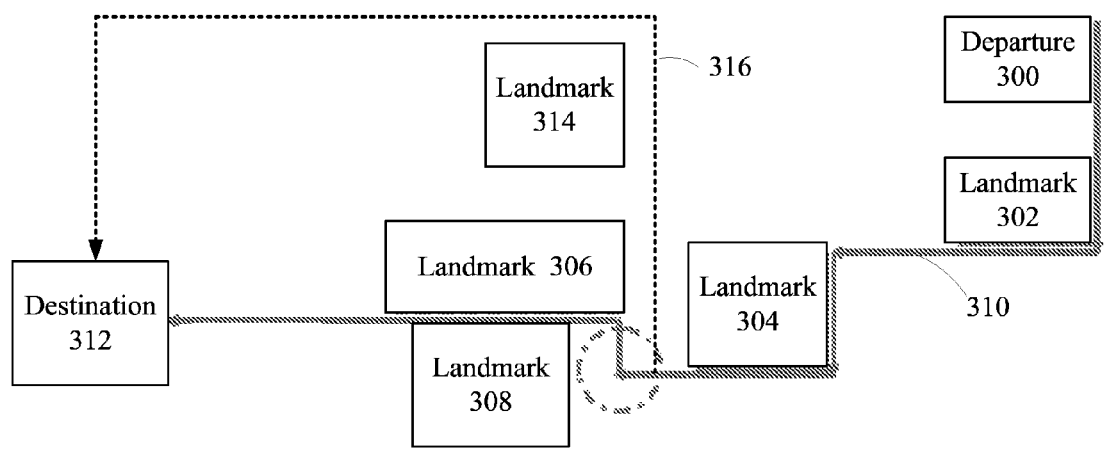

At 212, modification module 118D may present the modified map route to a user. In the present embodiment, modification module 118D present the new map route 316 to the user through a visual display of the map as shown in FIG. 3C.

Figure 4:
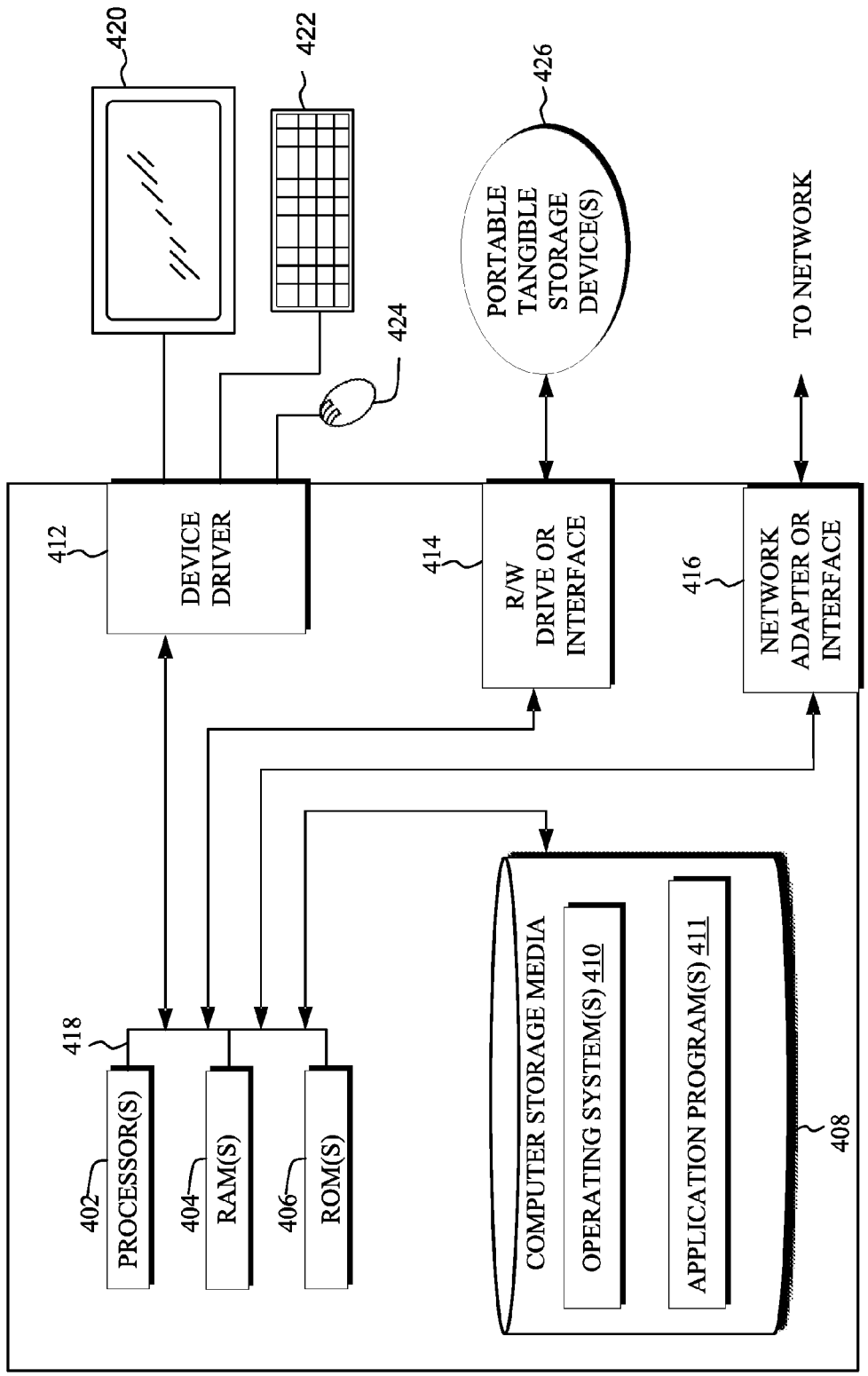
FIG. 4 is a block diagram of internal and external components of computers and servers depicted in FIG. 1, according to embodiments of the present invention.

Referring now to FIG. 4 of components a computer system, for example server 112 and data source 120, of environment 100 of FIG. 1, in accordance with an embodiment of the present disclosure.

Server 112 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 112 and computer 102 may also include an R/W drive or interface 414 to read from and write to one or more portable computer readable storage media 426. Application programs 411 on server 112 and computer 102 may be stored on one or more of the portable computer readable storage media 426, read via the respective R/W drive or interface 414 and loaded into the respective computer readable storage media 408.

Server 112 may also include a network adapter or interface 416, such as a TCP/IP adapter card or wireless communication adapter (such as a 4G wireless communication adapter using OFDMA technology). Application programs 411 on server 112 and may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 112 and computer 102 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

While the present disclosure is particularly shown and described with respect to preferred embodiments thereof, it will be understood by those skilled in the art that changes in forms and details may be made without departing from the spirit and scope of the present application. It is therefore intended that the present disclosure not be limited to the exact forms and details described and illustrated herein, but falls within the scope of the appended claims.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present disclosure. Therefore, the present disclosure has been disclosed by way of example and not limitation.

The invention claimed is:

1. A computer implemented method for landmark navigation, the method comprising:
   extracting information of a plurality of landmark candidates near a map route wherein near a map route is based on a pre-determined distance away from the map route;
   assigning a recognizability score to the plurality of landmark candidates;
   selecting a landmark among the plurality of landmark candidates based on the recognizability score;
   modifying the map route based on the selected landmark;
   providing a list of landmarks to a user based on the recognizability score; and
   presenting a modified map based on the user's selection.

2. The method of claim 1, wherein the recognizability score is based on one or more of distance, name of the landmark, user's desire, or logo characteristics.

3. The method of claim 1, wherein the recognizability score is based on the extracted information of the plurality of landmark candidates.

4. The method of claim 1, further comprising: presenting a user with the modified map route.

5. The method of claim 1, wherein the recognizability score is based on a user's input.

6. The method of claim 1, wherein the recognizability score is based on monitored information of user's internet activity.

7. A computer system for landmark navigation, the computer system comprising:
   one or more computer processors;
   one or more computer-readable storage media;
   program instructions stored on the computer-readable storage media for execution by at least one of the one or more processors, the program instructions comprising:
   instructions to extract information of a plurality of landmark candidates near a map route wherein near a map route is based on a pre-determined distance away from the map route;
   instructions to assign a recognizability score to the plurality of landmark candidates, wherein the recognizability score is based on the extracted information of the plurality of landmark candidates;
   instructions to select a landmark among the plurality of landmark candidates based on the recognizability score;
   instructions to modify the map route based on the selected landmark;
   providing a list of landmarks to a user based on the recognizability score; and
   presenting a modified map based on the user's selection.

8. The computer system of claim 7, wherein the recognizability score is based on one or more of distance, name of the landmark, user's desire, or logo characteristics.

9. The computer system of claim 7, further comprising: instructions to present a user with the modified map route.

10. The computer system of claim 7, wherein the recognizability score is based on a user's input.

11. The computer system of claim 7, wherein the recognizability score is based on monitored information of user's internet activity.

12. A computer program product for landmark navigation, comprising a computer-readable storage medium having program code embodied therewith, the program code executable by a processor of a computer to perform a method comprising:
   extracting information of a plurality of landmark candidates near a map route wherein near a map route is based on a pre-determined distance away from the map route;
   assigning a recognizability score to the plurality of landmark candidates, wherein the recognizability score is based on the extracted information of the plurality of landmark candidates;
   selecting a landmark among the plurality of landmark candidates based on the recognizability score;
   modifying the map route based on the selected landmark;

providing a list of landmarks to a user based on the recognizability score; and presenting a modified map based on the user's selection.

13. The computer program product of claim 12, wherein the recognizability score is based on one or more of distance, name of the landmark, user's desire, or logo characteristics.

14. The computer program product of claim 12, further comprising: presenting a user with the modified map route.

15. The computer program product of claim 12, wherein the recognizability score is based on a user's input.

16. The computer program product of claim 12, wherein the recognizability score is based on monitored information of user's internet activity.

* * * * *